United States Patent
Hosokawa et al.

(10) Patent No.: US 10,671,010 B2
(45) Date of Patent: Jun. 2, 2020

(54) POWER CONVERTING DEVICE AND IMAGE FORMING APPARATUS EMPLOYING THE SAME

(71) Applicant: TOSHIBA TEC KABUSHIKI KAISHA, Shinagawa-ku, Tokyo (JP)

(72) Inventors: Yoshiaki Hosokawa, Nagaizumi Sunto Shizuoka (JP); Yutaka Usami, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/203,702

(22) Filed: Nov. 29, 2018

(65) Prior Publication Data

US 2019/0212690 A1     Jul. 11, 2019

(30) Foreign Application Priority Data

Jan. 5, 2018  (JP) .................................. 2018-000776

(51) Int. Cl.
*H02M 1/32* (2007.01)
*H02M 7/12* (2006.01)
(Continued)

(52) U.S. Cl.
CPC ......... *G03G 15/80* (2013.01); *G03G 15/5004* (2013.01); *H01F 29/12* (2013.01);
(Continued)

(58) Field of Classification Search
CPC ...... H02H 7/1203; H02H 7/12; H02H 7/1213; H02H 7/125; H02H 7/1252; H02M 2001/322; H02M 1/32
See application file for complete search history.

(56) References Cited

U.S. PATENT DOCUMENTS 6,798,671 B1 * 9/2004 Sakai .................... H02M 3/338
                                                    363/19
8,937,471 B2 * 1/2015 Kobayashi .............. H02M 1/32
                                                    320/166
(Continued)

FOREIGN PATENT DOCUMENTS

JP    2007-49833    2/2007
JP    2015-163040   9/2015

*Primary Examiner* — Daniel Kessie
*Assistant Examiner* — Sisay G Tiku
(74) *Attorney, Agent, or Firm* — Amin, Turocy & Watson, LLP (57) ABSTRACT

According to one embodiment, a power converting device includes a rectifier bridge configured to pulsate an AC voltage to generate a pulsating voltage, a first smoothing capacitor configured to smooth the pulsating voltage to generate a DC voltage, a primary winding connected to the first smoothing capacitor, a switch circuit configured to switch the DC voltage supplied from the first smoothing capacitor to the primary winding, and a first discharge circuit. The first discharge circuit includes a first discharge resistor configured to discharge electric charges remaining on the first smoothing capacitor and a first switch element configured to release the first discharge resistor from the first smoothing capacitor if the AC voltage is supplied and to connect the first discharge resistor to the first smoothing capacitor if the AC voltage is not supplied and the electric charges remain on the first smoothing capacitor.

16 Claims, 4 Drawing Sheets

(51) Int. Cl.
  H02M 7/06     (2006.01)
  G03G 15/00    (2006.01)
  H02M 7/162    (2006.01)
  H01F 29/12    (2006.01)
  H02M 7/217        (2006.01)
  H02M 1/42         (2007.01)

(52) U.S. Cl.
  CPC ............ H02M 1/32 (2013.01); H02M 7/162 (2013.01); *H02M 1/4258* (2013.01); *H02M 7/06* (2013.01); *H02M 7/2176* (2013.01); *H02M 2001/322* (2013.01)

(56) References Cited

U.S. PATENT DOCUMENTS

| | | | | |
|---|---|---|---|---|
| 9,252,669 | B2* | 2/2016 | Nate | H02M 3/335 |
| 10,170,975 | B1* | 1/2019 | Feng | H02M 1/126 |
| 2002/0027787 | A1* | 3/2002 | Nishida | H02M 3/3385 |
| | | | | 363/21.16 |
| 2002/0110003 | A1* | 8/2002 | Hosotani | H02M 3/3385 |
| | | | | 363/19 |
| 2003/0031035 | A1* | 2/2003 | Kitano | H02M 1/12 |
| | | | | 363/49 |
| 2004/0109334 | A1* | 6/2004 | Murakami | H02M 3/3385 |
| | | | | 363/49 |
| 2008/0049472 | A1* | 2/2008 | Nishida | H02M 3/3381 |
| | | | | 363/84 |
| 2011/0122668 | A1* | 5/2011 | Lo | H02J 9/061 |
| | | | | 363/126 |
| 2012/0080947 | A1* | 4/2012 | Karino | H02J 1/14 |
| | | | | 307/31 |
| 2012/0294048 | A1* | 11/2012 | Brinlee | H02M 1/36 |
| | | | | 363/21.18 |
| 2013/0147440 | A1* | 6/2013 | Shiroyama | G01R 31/40 |
| | | | | 320/166 |
| 2013/0148998 | A1* | 6/2013 | Shimura | G03G 15/80 |
| | | | | 399/88 |
| 2014/0125293 | A1* | 5/2014 | Kainuma | H02J 7/00 |
| | | | | 320/166 |
| 2015/0180349 | A1* | 6/2015 | Hayasaki | G03G 15/80 |
| | | | | 399/88 |
| 2017/0075289 | A1* | 3/2017 | Shimura | G03G 15/80 |
| 2018/0019656 | A1* | 1/2018 | Matsuda | H02M 1/32 |
| 2019/0058406 | A1* | 2/2019 | Asano | H02M 3/33569 |

\* cited by examiner

POWER CONVERTING DEVICE AND IMAGE FORMING APPARATUS EMPLOYING THE SAME

CROSS-REFERENCE TO RELATED APPLICATION

This application is based upon and claims the benefit of priority from Japanese Patent Application No. P2018-000776, filed on Jan. 5, 2018, the entire contents of which are incorporated herein by reference.

FIELD

Embodiments described herein relate generally to a power converting device and an image forming apparatus which utilizes the power converting device.

BACKGROUND

A power converting device that converts electric power is generally used in well-known electronic apparatuses. The power converting device pulsates, with a full-wave rectifier circuit, an AC voltage from an AC power supply and smoothes a pulsated positive voltage with a capacitor to produce a DC voltage. The power converting device converts the DC voltage into high-frequency pulses by performing switching control. The power converting device includes a primary winding for generating a magnetic field with the high-frequency pulses converted by a converter and a secondary winding excited by the magnetic field generated with the primary winding. The power converting device supplies the converted electric power to a load connected to the secondary winding.

In the power converting device described above, a resistor for discharging the potential of the capacitor for smoothing if supply of electric power from the AC power supply stops is connected in parallel to the capacitor. The resistor is connected in parallel to the capacitor even while the electric power is supplied from the AC power supply and thus a power loss occurs inevitably in the power converting device.

DETAILED DESCRIPTION

According to an embodiment, a power converting device includes a rectifier bridge configured to pulsate an AC voltage to generate a pulsating voltage, a first smoothing capacitor configured to smooth the pulsating voltage to generate a DC voltage, a primary winding connected to the first smoothing capacitor, a switch circuit configured to switch the DC voltage supplied from the first smoothing capacitor to the primary winding, and a first discharge circuit. The first discharge circuit includes a first discharge resistor configured to discharge electric charges remaining on the first smoothing capacitor, and a first switch element configured to release the first discharge resistor from the first smoothing capacitor if the AC voltage is supplied and to connect the first discharge resistor to the first smoothing capacitor if the AC voltage is not supplied and the electric charges remain on the first smoothing capacitor.

Hereinafter, an embodiment is described in detail with reference to the accompanying drawings.

Figure 1:
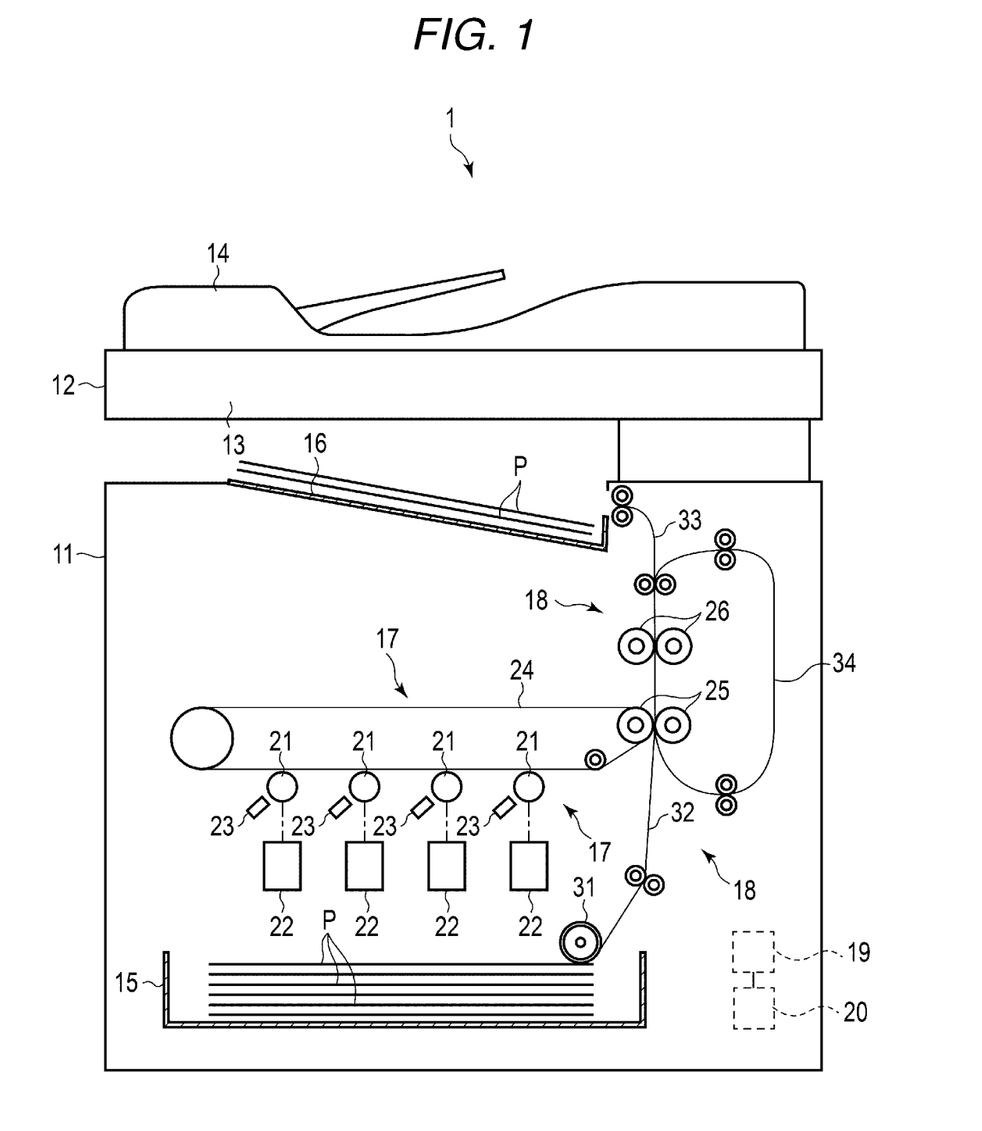
FIG. 1 is a side view schematically illustrating an image forming apparatus according to an embodiment.

FIG. 1 is a side view schematically illustrating an image forming apparatus according to a present embodiment.

The image forming apparatus 1 is, for example, a multi-function printer (MFP) that performs various kinds of processing such as an image formation while conveying a recording medium such as a printing paper. The image forming apparatus 1 charges a photosensitive drum and irradiates light modulated with an image data for printing (printing data) on the photosensitive drum to form a latent image (electrostatic latent image) on the photosensitive drum. The image forming apparatus 1 develops the latent image on the photosensitive drum with a toner (developing agent) and transfers the developed image to the printing paper to form a toner image (visible image) on the printing paper. Further, the image forming apparatus 1 conveys the printing paper, on which the toner image is formed, to a fixing roller heated by a heater and fixes the toner image on the printing paper through the fixing roller.

The image forming apparatus 1 focuses a reflecting light irradiated to a document (original) on an image sensor and converts electric charges accumulated on the image sensor to digital signals to acquire an image of the document.

The image forming apparatus 1 includes a housing 11, a document table 12, a scanner unit 13, an ADF (automatic document feeding unit) 14, a paper feeding cassette 15, a paper discharge tray 16, an image forming unit 17, a conveying unit 18, a main control unit 19, and a power converting device 20.

The housing 11 is a main body that holds the document table 12, the scanner unit 13, the ADF 14, the paper feeding cassette 15, the paper discharge tray 16, the image forming unit 17, the conveying unit 18, the main control unit 19, and the power converting device 20.

The document table 12 supports a document (original) thereon.

The scanner unit 13 includes an image sensor, an optical element, and a light unit to acquire an image from the document on the document table 12 under the control of the main control unit 19.

The image sensor is an imaging element on which pixels for converting light into an electric signal (image signal) are linearly arrayed. The image sensor is composed of, for example, a charge coupled device (CCD), a complimentary metal oxide semiconductor (CMOS), or another imaging element.

The optical element focuses light from a predetermined reading area on the pixels of the image sensor. The reading area of the optical element forms a linear region on the document table 12. The optical element focuses, on the pixels of the image sensor, light reflected from the document placed on the document table 12.

The light unit irradiates light on the document. The light unit includes a light source and a light guide body for irradiating light from the light source to the document. The light unit irradiates light emitted from the light source on a region including the reading area of the optical element through the light guide body.

If the document is placed on the document table 12, the scanner unit 13 is driven by a driving mechanism (not-illustrated) in a sub-scanning direction, orthogonal to an array direction of the pixels of the image sensor (main scanning direction), which is parallel to the document table 12. The scanner unit 13 continuously acquires an image of the document in the main scanning direction line by line with the image sensor while it is driven in the sub-scanning direction to acquire image data of the entire document placed on the document table 12.

The ADF 14 includes a feeding mechanism for automatically conveying the document. The ADF 14 is provided on the document table 12 to be capable of opening and closing. The ADF 14 takes a paper document placed on a tray into the feeding mechanism and conveys the paper document along a glass plate of the document table 12 under the control by the main control unit 19.

When the ADF 14 conveys the paper document to the glass plate, the scanner unit 13 is moved to a position opposed to a position at which the paper document is taken to the glass plate by the ADF 14. The scanner unit 13 continuously acquires the image of the paper document in the main scanning direction line by line with the image sensor from the paper document conveyed by the ADF 14 to acquire image data (document image data) of the entire paper document conveyed by the ADF 14.

The paper feeding cassette 15 stores the printing paper P. The printing papers P is replenished to the paper feeding cassette 15 from the outside of the housing 11 if the printing papers P are consumed. For example, the paper feeding cassette 15 is taken out from the housing 11 at the time the printing paper P is replenished.

The paper discharge tray 16 supports the printing paper P discharged from the image forming apparatus 1 after the visible image (document image) is fixed on the printing paper P.

The image forming unit 17 forms the image of the document on the printing paper P under the control by the main control unit 19. For example, the image forming unit 17 charges the surface of the photosensitive drum, forms a latent image corresponding to image data for printing (printing data) on the charged drum, develops the latent image formed on the drum with toner, and transfers the toner image onto the printing paper P to form the image of the document on the printing paper P. The image forming unit 17 includes, in a case of forming a color image as illustrated in FIG. 1, photosensitive drums 21, exposing devices 22, developing devices 23, a transfer belt (intermediate transfer belt) 24, a pair of transfer rollers 25, and a pair of fixing rollers (heat roller and pressure roller) 26. As illustrated in FIG. 1, the drums 21, the exposing devices 22 and the developing devices 23 are arranged one to one manner.

The photosensitive drums 21 are respectively formed in a cylindrical shape. The drums 21 are arranged in contact with the transfer belt 24. The surfaces of the drums 21 are uniformly charged by chargers (not shown) such as a corotron, respectively. The drums 21 are rotated at a constant speed by a driving mechanisms (not illustrated in FIG. 1).

The exposing devices 22 respectively form electrostatic latent images on the charged drums 21 according to color image data, for example, cyan, magenta, yellow and black. The exposing devices 22 irradiate laser beams on the surfaces of the drums 21 with light emitting elements or the like according to printing data to form electrostatic latent images on the surfaces of the drums 21. The exposing devices 22 include light emitting units and optical elements.

The light emitting units respectively include light emitting elements linearly arrayed which emit lights modulated with electric signals (image signals). The light emitting elements of the light emitting units emit lights having a wavelength capable of forming latent images on the charged drums 21. The lights emitted from the light emitting units are focused on the surfaces of the drums 21 by the optical elements.

The developing devices 23 develop the electrostatic latent images formed on the drums 21 with color toners (developers). Consequently, the developing devices 23 form color images of the toners (toner images) on the surfaces of the drums 21.

The drums 21, the exposing devices 22, and the developing devices 23 of the image forming unit 17 are provided for each of different colors of, for example, cyan, magenta, yellow, and black as described above. In this case, the developing devices 23 respectively store toners of different colors.

The transfer belt 24 is a member for receiving the toner images formed on the surfaces of the drums 21 to produce a color image, which is transferred onto the printing paper P. The transfer belt 24 is stretched to be laid between rollers to be moved by rotation of the rollers. The transfer belt 24 cumulatively receives the toner images formed on the drums 21 at positions where the transfer belt 24 is in contact with the drums 21 to form color image and carries the formed color image to the pair of transfer rollers 25.

The pair of transfer rollers 25 is arranged such that they sandwich the transfer belt 24 and the printing paper P supplied from the paper feeding cassette 15 therebetween. The pair of transfer rollers 25 transfers the color image on the transfer belt 24 onto the printing paper P.

The pair of fixing rollers 26 sandwiches the printing paper P conveyed from the pair of transfer rollers 25. One of the pair of fixing rollers (heat roller) 26 is heated by a heater (not shown). The pair of fixing rollers 26 in a heated state applies pressure to the sandwiched printing paper P to fix the color image (toner image) transferred to the printing paper P.

The conveying unit 18 conveys the printing paper P. The conveying unit 18 includes a conveyance path formed by a plurality of guides and a plurality of rollers and sensors for detecting conveying positions of the printing paper P by the conveyance path. The conveyance path guides the printing paper P. The conveying rollers are rotated by a motor, which operates under the control by the main control unit 19, to convey the printing paper P along the conveyance path. A part of the plurality of guides is rotated by a motor, which operates under the control by the main control unit 19, to switch the conveyance path for guiding the printing paper P.

The conveying unit 18 includes, for example, as illustrated in FIG. 1, a pickup roller 31, a paper-feeding conveyance path 32, a paper-discharge conveyance path 33, and a reversal conveyance path 34.

The pickup roller 31 takes the printing paper P, which is stored in the paper feeding cassette 15, into the paper-feeding conveyance path 32.

The paper-feeding conveyance path 32 conveys the printing paper P, which is picked up from the paper feeding cassette 15 by the pickup roller 31, to the image forming unit 17.

The paper-discharge conveyance path 33 discharges the printing paper P, on which the color image is formed by the image forming unit 17, from the housing 11. The printing paper P discharged by the paper-discharge conveyance path 33 is supported on the paper discharge tray 16.

The reversal conveyance path 34 resupplies the printing paper P, on which the image is formed by the image forming unit 17, to the image forming unit 17 in a state in which the front and rear surfaces, and the front and the back, of the printing paper P are reversed to perform a duplex printing.

The main control unit 19 performs control of the image forming apparatus 1. The main control unit 19 includes, for example, a CPU, a ROM, a RAM, and a nonvolatile memory.

The CPU is a processor that executes arithmetic processing. The CPU performs various kinds of processing according to data such as computer programs stored in the ROM. The CPU executes the computer programs to function as a control unit capable of performing various operations. The CPU inputs, for example, printing data for forming an image on the printing paper P to the image forming unit 17. The CPU also inputs a conveyance control signal for instructing conveyance of the printing paper P to the conveying unit 18.

The ROM is a read-only nonvolatile memory. The ROM stores computer programs, data used in the computer programs, and the like.

The RAM is a volatile memory functioning as a working memory. The RAM temporarily stores, for example, data being processed by the CPU. The computer programs executed by the CPU are temporarily developed or decompressed on the RAM.

The nonvolatile memory is a storage medium (main storage unit) capable of storing various kinds of information or data. The nonvolatile memory stores computer programs, data used in the computer programs, and the like. The nonvolatile memory is, for example, a solid state drive (SSD), a hard disk drive (HDD), or another storage device. A memory I/F such as a card slot, into which a storage medium such as a memory card can be inserted, may be provided instead of the nonvolatile memory.

The CPU switches operation states of the image forming apparatus 1. The operation states include states such as a ready state in which formation of an image on the printing paper P is possible and a sleep state in which the image forming apparatus 1 stands by for an input of predetermined operation.

The power converting device 20 includes a primary side to which electric power is supplied and a secondary side from which electric power is output. An AC power supply AC such as a commercial power supply is connected to the primary side. A load W representing various components of the image forming apparatus 1 is connected to the secondary side. The power converting device 20 is a power supply circuit that converts an AC voltage input to the primary side from the AC power supply AC into a DC voltage supplied to the load W connected to the secondary side.

Figure 2:
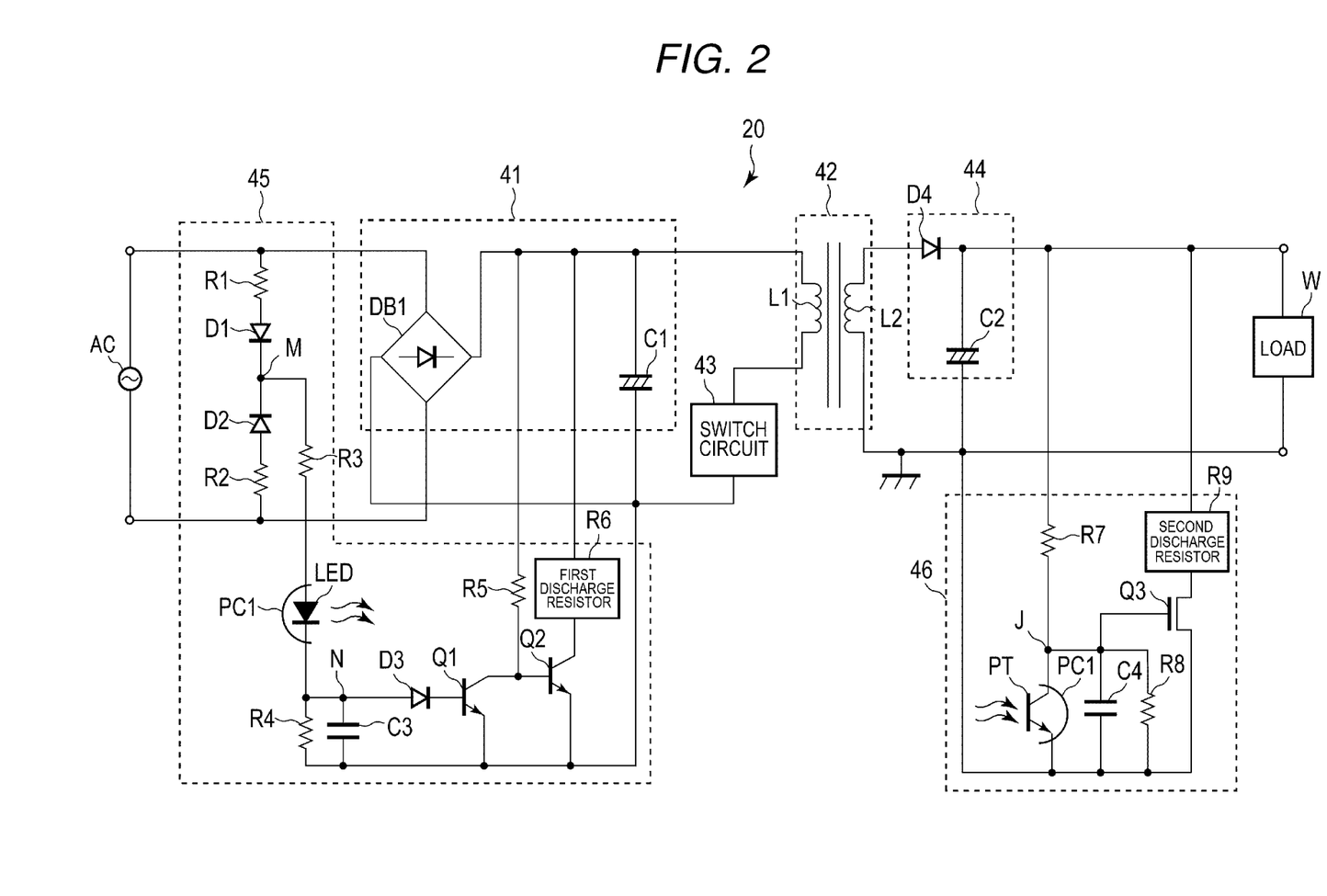
FIG. 2 is a diagram illustrating a circuit arrangement of a power converting device according to the embodiment.

FIG. 2 is a diagram illustrating a circuit arrangement of the power converting device 20. The power converting device 20 includes a DC voltage source 41, an isolation transformer 42, a switch circuit 43, a rectifying smoothing circuit 44, a first discharge circuit 45, and a second discharge circuit 46. The power converting device 20 may further include a power factor improvement circuit.

First, the primary side of the power converting device 20 is described.

The DC voltage source 41 full-wave rectifies an AC voltage input from the AC power supply AC to produce a DC voltage and supplies the DC voltage to circuits connected thereto. For example, the DC voltage source 41 includes a rectifier bridge DB1 and a first smoothing capacitor C1.

The rectifier bridge DB1 is a full-wave rectifier circuit composed of a plurality of diodes. An input terminal of the rectifier bridge DB1 is connected to the AC power supply AC. The rectifier bridge DB1 pulsates the AC voltage supplied from the AC power supply AC and supplies a pulsated positive voltage to the first smoothing capacitor C1.

The first smoothing capacitor C1 is connected to an output terminal of the rectifier bridge DB1. The first smoothing capacitor C1 smoothes the pulsated positive voltage supplied from the rectifier bridge DB1 to produce the DC voltage. The first smoothing capacitor C1 supplies the DC voltage to a circuit connected in parallel to the first smoothing capacitor C1.

The isolation transformer 42 includes a winding at the primary side (primary winding) L1 that generates a magnetic field and a winding at the secondary side (secondary winding) L2 isolated from the primary winding L1 and excited by the magnetic field generated with the primary winding L1.

The switch circuit 43 is a semiconductor switch. The switch circuit 43 is, for example, an n-type channel FET.

The primary winding L1 of the isolation transformer 42, a drain terminal of the switch circuit 43, and a source terminal of the switch circuit 43 are connected in series. Specifically, one of the terminals of the primary winding L1 is connected to the first smoothing capacitor C1, the other terminal of the primary winding L1 is connected to the drain terminal of the switch circuit 43, the source terminal of the switch circuit 43 is connected to a low-potential side of the first smoothing capacitor C1, and a gate terminal of the switch circuit 43 is connected to a control circuit (not shown).

The switch circuit 43 switches a conduction state (ON state) in which the drain terminal and the source terminal are conducted and a non-conduction state (OFF state) in which the drain terminal and the source terminal are non-conducted according to a control signal input to the gate terminal from the control circuit.

The control circuit inputs the control signal, for example, a high-frequency pulse signal, to the gate terminal of the switch circuit 43 as described above. Consequently, the control circuit switches the ON state and the OFF state of the switch circuit 43 at a high speed. As a result, a high-frequency pulse is supplied to the primary winding L1 of the isolation transformer 42 with the potential of the first smoothing capacitor C1. A magnetic field is generated by the primary winding L1.

As described above, the switch circuit 43 functions as a fly-back converter that converts a DC voltage to a high-frequency pulses. The switch circuit 43 may be formed with another converter circuit such as a half-bridge converter or a full-bridge converter that supplies a high-frequency pulse to the primary winding L1 of the isolation transformer 42 with the potential of the first smoothing capacitor C1.

The secondary side of the power converting device 20 is described.

The secondary winding L2 of the isolation transformer 42 is excited with the magnetic field generated by the primary winding L1 to generate an electric power. A voltage corresponding to a ratio of winding numbers of the primary winding L1 and the secondary winding L2 is generated on the secondary winding L2.

The rectifying smoothing circuit 44 rectifies and smoothes the electric power generated on the secondary winding L2. The rectifying smoothing circuit 44 includes a rectifier diode D4 and a second smoothing capacitor C2.

An anode of the rectifier diode D4 is connected to the secondary winding L2. A cathode of the rectifier diode D4 is connected to the second smoothing capacitor C2. The rectifier diode D4 rectifies an electric current generated on the secondary winding L2 and supplies the electric current to the second smoothing capacitor C2.

The second smoothing capacitor C2 smoothes a positive voltage supplied from the rectifier diode D4 to produce a DC voltage. The second smoothing capacitor C2 supplies the DC voltage (smoothed DC voltage) to a circuit connected in parallel to the second smoothing capacitor C2. In the present embodiment, the load W is connected to the second smoothing capacitor C2. The second smoothing capacitor C2 supplies the smoothed DC voltage to the load W.

The first discharge circuit 45 includes a resistor R1, a resistor R2, a resistor R3, a resistor R4, a resistor R5, a first discharge resistor R6, a diode D1, a diode D2, a diode D3, a photocoupler PC1, a switch element Q1, a switch element Q2, and a capacitor C3.

One of the terminals of the resistor R1 is connected to one of the terminals of the AC power supply AC and the other terminal is connected to an anode of the diode D1. One of the terminals of the resistor R2 is connected to the other terminal of the AC power supply AC. The other terminal of the resistor R2 is connected to an anode of the diode D2. Cathodes of the diode D1 and the diode D2 are connected to each other at a connection point M. One of the terminals of the resistor R3 is also connected to the connection point M.

The photocoupler PC1 includes a light emitting diode LED and a phototransistor PT. In the photocoupler PC1, if an electric current flows from an anode to a cathode of the light emitting diode LED and thus the light emitting diode LED emits light, the light is made incident on the phototransistor PT and a collector and an emitter of the phototransistor PT are conducted.

In the photocoupler PC1, the anode of the light emitting diode LED is connected to the other terminal of the resistor R3. The resistor R4, the capacitor C3, and anode of the diode D3 connected in parallel are connected to the cathode of the light emitting diode LED of the photocoupler PC1 at a connection point N. The resistor R4 and the capacitor C3 are connected between the cathode of the light emitting diode LED of the photocoupler PC1 and the low-potential side of the first smoothing capacitor C1.

The switch element Q1 and the switch element Q2 are semiconductor switches and are, for example, npn-type transistors. The switch element Q1 and the switch element Q2 may be n-type MOSFETs.

A base terminal (control terminal) of the switch element Q1 is connected to a cathode of the diode D3. An emitter of the switch element Q1 is connected to the low-potential side of the first smoothing capacitor C1. A collector of the switch element Q1 is connected to a base terminal (control terminal) of the switch element Q2. The collector of the switch element Q1 is connected to the first smoothing capacitor C1 via the resistor R5. One of the terminals of the resistor R5 is connected between the first smoothing capacitor C1 and an output terminal of the DC voltage source 41 and the other terminal is connected between the collector of the switch element Q1 and the base terminal of the switch element Q2.

An emitter of the switch element Q2 is connected to the low-potential side of the first smoothing capacitor C1. A collector of the switch element Q2 is connected to the first smoothing capacitor C1 via the first discharge resistor R6.

The first discharge resistor R6 discharges electric charges accumulated on the first smoothing capacitor C1. The first discharge resistor R6 has a lower resistance value compared with the resistor R5. One of the terminals of the first discharge resistor R6 is connected between the first smoothing capacitor C1 and the output terminal of the DC power supply 41 and the other terminal is connected to the collector of the switch element Q2.

The second discharge circuit 46 includes a resistor R7, a resistor R8, a second discharge resistor R9, a photocoupler PC1, a switch element Q3, and a capacitor C4.

One of the terminals of the resistor R7 is connected to an output terminal of the rectifying smoothing circuit 44. The other terminal of the resistor R7 is connected at a connection point J. A collector of a phototransistor PT of the photocoupler PC1, the capacitor C4, the resistor R8, and a gate terminal (control terminal) of the switch element Q3 connected in parallel with one another are connected at the connection point J. The collector of the phototransistor PT of the photocoupler PC1, the capacitor C4, the resistor R8, and the gate terminal of the switch element Q3 are connected in parallel with one another and they are connected to the other terminal of the resistor R7 at the connection point J. The resistor R8 and the capacitor C4 are connected between the connection point J and the ground.

As described above, in the photocoupler PC1, the light emitting diode LED is provided in the first discharge circuit 45 and the phototransistor PT is provided in the second discharge circuit 46. The emitter of the phototransistor PT is connected to the ground. The collector and the emitter of the phototransistor PT are conducted while the light emitting diode LED is emitting light.

The switch element Q3 is a semiconductor switch and is, for example, an n-type MOSFET. The switch element Q3 may be an npn-type transistor.

A gate of the switch element Q3 is connected to the connection point J. A source of the switch element Q3 is connected to the ground. A drain of the switch element Q3 is connected to the output terminal of the rectifying smoothing circuit 44 via the second discharge resistor R9.

The second discharge resistor R9 discharges electric charges accumulated on the second smoothing capacitor C2. The second discharge resistor R9 has a lower resistance value compared with the resistor R7. One of the terminals of the second discharge resistor R9 is connected between the second smoothing capacitor C2 and an output terminal to which the load W is connected. The other terminal of the second discharge resistor R9 is connected to the drain of the switch element Q3.

The operations of the first discharge circuit 45 and the second discharge circuit 46 of the power converting device 20 are described.

Figure 3:
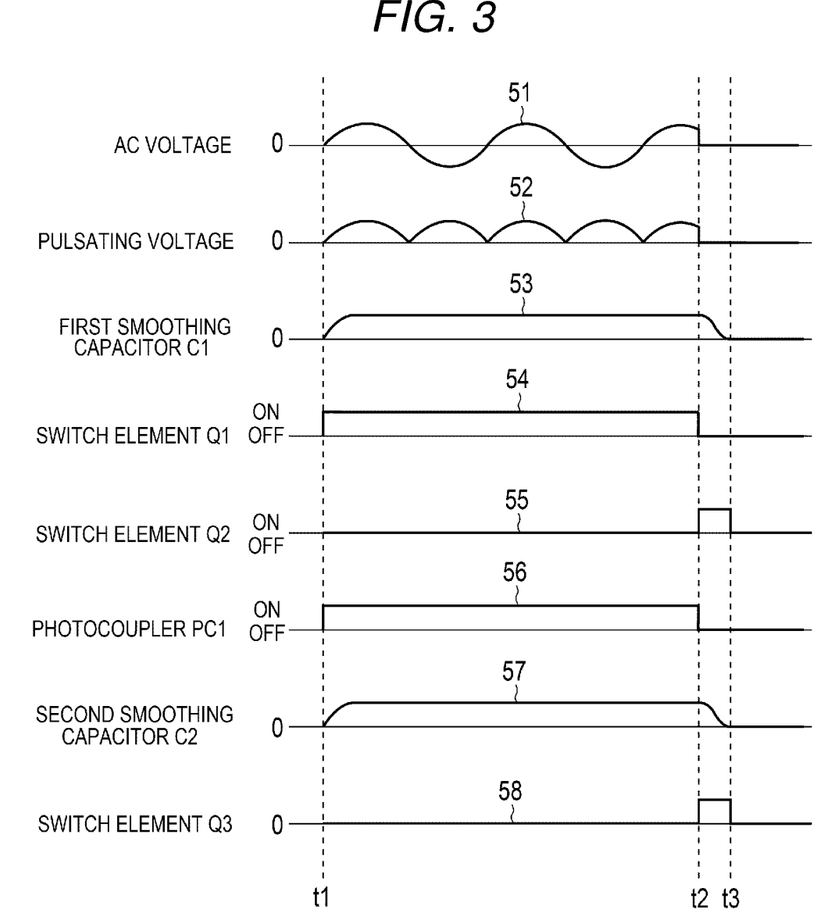
FIG. 3 is a timing chart illustrating the operation of the power converting device shown in FIG. 2.

FIG. 3 is a timing chart illustrating the operation of the power converting device 20. A first graph 51 indicates AC voltage supplied from the AC power supply AC. A second graph 52 indicates a pulsating voltage pulsated by the rectifier bridge DB1 of the DC voltage source 41. A third graph 53 indicates electric charges accumulated on the first smoothing capacitor C1. A fourth graph 54 indicates an ON/OFF timing of the switch element Q1. A fifth graph 55 indicates an ON/OFF timing of the switch element Q2. A sixth graph 56 indicates an ON/OFF timing of the photocoupler PC1 (i.e., timing of light emission of the light emitting diode LED and timing of conducting the collector and the emitter of the phototransistor PT). A seventh graph 57 indicates electric charges accumulated on the second smoothing capacitor C2. An eighth graph 58 indicates an ON/OFF timing of the switch element Q3. In the following description, it is assumed that, at timing t1, supply of AC voltage from the AC power supply AC is started, at timing t2, the supply of the AC voltage from the AC power supply AC is cut off, and, at timing t3, all of the electric charges of the first smoothing capacitor C1 and the second smoothing capacitor C2 are discharged.

First, at the timing t1, when the supply of the AC voltage from the AC power supply AC is started, a pulsating voltage is sequentially generated by the rectifier bridge DB1 of the DC voltage source 41. Electric charges are accumulated on the first smoothing capacitor C1 with the pulsating voltage.

In the first discharge circuit 45, electric current flows to the connection point M, the resistor R3, the light emitting diode LED of the photocoupler PC1, the diode D3, and the base of the switch element Q1 in this order with the AC voltage supplied from the AC power supply AC. Consequently, the light emitting diode LED of the photocoupler PC1 emits light and the switch element Q1 is switched to the ON state.

If the switch element Q1 is switched to the ON state, electric current flowing from the output terminal of the DC voltage source 41 via the resistor R5 flows to the collector of the switch element Q1 rather than the base of the switch element Q2. Consequently, the switch element Q2 is switched to the OFF state. In this way, the switch element Q2 maintains the OFF state and electric current does not flow to the first discharge resistor R6 while the AC voltage is supplied from the AC power supply AC.

While the light emitting diode LED of the photocoupler PC1 is continuing the light emission, the collector and the emitter of the phototransistor PT of the photocoupler PC1 maintain a conduction state. Therefore, in the second discharge circuit 46, electric current flows to the second smoothing capacitor C2, the resistor R7, the connection point J, the collector of the phototransistor PT of the photocoupler PC1, the emitter of the phototransistor PT, and the ground in this order with the potential of the second smoothing capacitor C2. Consequently, the switch element Q3 is switched to the OFF state. In this way, the switch element Q3 maintains the OFF state and electric current does not flow to the second discharge resistor R9 while the AC voltage is supplied from the AC power supply AC.

Subsequently, at the timing t2, when the supply of the AC voltage from the AC power supply AC is cut off, the pulsating voltage, i.e., an output of the DC voltage source 41, is cut off. However, the electric charges remain on the first smoothing capacitor C1 at the time (just after) the supply of the AC voltage from the AC power supply is cut off.

In the first discharge circuit 45, since the AC voltage is not supplied from the AC power supply AC, electric current does not flow to the photocoupler PC1 and the base of the switch element Q1. Consequently, the light emitting diode LED of the photocoupler PC1 is extinguished. The switch element Q1 is switched to the OFF state.

If the switch element Q1 is switched to the OFF state, electric current flowing from the first smoothing capacitor C1 via the resistor R5 flows to the base of the switch element Q2 rather than the collector of the switch element Q1. Thus, the switch element Q2 is switched to the ON state. If the switch element Q2 is switched to the ON state, electric current flows to the first smoothing capacitor C1, the first discharge resistor R6, the collector of the switch element Q2, the emitter of the switch element Q2, and the low-potential side of the first smoothing capacitor C1 in this order with the potential of the first smoothing capacitor C1. As a result, the electric charges remaining on the first smoothing capacitor C1 are discharged through the first discharge resistor R6.

If the light emitting diode LED of the photocoupler PC1 is extinguished, the collector and the emitter of the phototransistor PT of the photocoupler PC1 are switched to the non-conduction state. Therefore, electric current flows to the second smoothing capacitor C2, the resistor R7, the connection point J, and the gate of the switch element Q3 in this order with the potential of the second smoothing capacitor C2. Consequently, the switch element Q3 is switched to the ON state. If the switch element Q3 is switched to the ON state, electric current flows to the second smoothing capacitor C2, the second discharge resistor R9, the drain of the switch element Q3, the source of the switch element Q3, and the ground in this order with the potential of the second smoothing capacitor C2. As a result, the electric charges remaining on the second smoothing capacitor C2 are discharged through the second discharge resistor R9.

Subsequently, at the timing t3, if all of the electric charges on the first smoothing capacitor C1 are discharged, no electric current flows to the base of the switch element Q2 from the first smoothing capacitor C1 via the resistor R5. Thus, the switch element Q2 is switched to the OFF state. As a result, the first discharge resistor R6 is released.

Further, if all of the electric charges on the second smoothing capacitor C2 are discharged, no electric current flows to the gate of the switch element Q3 from the second smoothing capacitor C2 via the resistor R7. Therefore, the switch element Q3 is switched to the OFF state. As a result, the second discharge resistor R9 is released.

As described above, the power converting device 20 includes the rectifier bridge DB1 for pulsating the AC power supply AC, the first smoothing capacitor C1 for smoothing a pulsating voltage, the primary winding L1 connected to the first smoothing capacitor C1, the switch circuit 43 for switching a DC voltage supplied from the first smoothing capacitor C1 to the primary winding L1, and the first discharge circuit 45 for discharging electric charges accumulated on the first smoothing capacitor C1. The first discharge circuit 45 includes the first discharge resistor R6 for discharging the electric charges remaining on the first smoothing capacitor C1 and the switch element Q2 for releasing the first discharge resistor R6 from the first smoothing capacitor C1 if an AC voltage is supplied from the AC power supply AC and for connecting the first discharge resistor R6 to the first smoothing capacitor C1 if the AC voltage is not supplied from the AC power supply AC and the electric charges remain on the first smoothing capacitor C1.

According to the arrangement described above, if the supply of the AC voltage from the AC power supply AC is cut off, the first discharge circuit 45 connects the first discharge resistor R6 to the first smoothing capacitor C1 to forma current path for discharging the electric charges on the first smoothing capacitor C1. Consequently, the first discharge circuit 45 can discharge the electric charges remaining on the first smoothing capacitor C1 at the time the supply of the AC voltage from the AC power supply AC is cut off. If the AC voltage is supplied from the AC power supply AC, the first discharge resistor R6 is released from the first smoothing capacitor C1. Therefore, the power converting device 20 can prevent a loss of power by the first discharge resistor R6 from occurring during power supply operation.

The power converting device 20 includes the secondary winding L2 excited by a magnetic field generated with the primary winding L1, the second smoothing capacitor C2 for smoothing a voltage generated with the secondary winding L2, and the second discharge circuit 46. The second discharge circuit 46 includes the second discharge resistor R9 for discharging electric charges remaining on the second smoothing capacitor C2 and the switch element Q3 for releasing the second discharge resistor R9 from the second smoothing capacitor C2 if an AC voltage is supplied from the AC power supply AC at the primary side and for connecting the second discharge resistor R9 to the second smoothing capacitor C2 if the AC voltage is not supplied from the AC power supply AC and the electric charges remain on the second smoothing capacitor C2.

According to the arrangement described above, if the supply of the AC voltage from the AC power supply AC is cut off, the second discharge circuit 46 connects the second discharge resistor R9 to the second smoothing capacitor C2 to form a current path for discharging the electric charges on the second smoothing capacitor C2. Consequently, the second discharge circuit 46 can discharge the electric charges remaining on the second smoothing capacitor C2 at the time the supply of the AC voltage from the AC power supply AC is cut off. If the AC voltage is supplied from the AC power supply AC, the second discharge resistor R9 is released from the second smoothing capacitor C2. Therefore, the power converting device 20 can prevent a loss of power by the second discharge resistor R9 from occurring during the power supply operation.

The first discharge circuit 45 and the second discharge circuit 46 include the light emitting diode LED and the photocoupler PC1 including the phototransistor PT that is in the conduction state while the light emitting diode LED is emitting light. The light emitting diode LED is provided in the first discharge circuit 45 to emit light while the AC voltage is supplied from the AC power supply AC. The phototransistor PT is provided in the second discharge circuit 46 and is conducted while light is received from the light emitting diode LED. If the phototransistor PT is in the ON state, the phototransistor PT connects the control terminal of the switch element Q3 to the ground. If the phototransistor PT is in the OFF state, the phototransistor PT releases the control terminal of the switch element Q3 from the ground. If the control terminal of the switch element Q3 is released from the ground, the switch element Q3 is turned to the on state with the potential of the second smoothing capacitor C2 to connect the second discharge resistor R9 to the second smoothing capacitor C2.

According to the arrangement described above, the second discharge circuit 46 can connect the second discharge resistor R9 to the second smoothing capacitor C2 in response to the supply of the AC voltage from the AC power supply AC at the primary side in a state in which the second discharge circuit 46 is isolated from the primary side.

The first discharge circuit 45 further includes the resistor R5, having a larger resistance value compared with the first discharge resistor R6, which is connected between the first smoothing capacitor C1 and the switch element Q2, and the switch element Q1 that connects the control terminal of the switch element Q2 to the low-potential side of the first smoothing capacitor C1 if the switch element Q1 is switched to the ON state with the AC voltage from the AC power supply AC and releases the control terminal of the switch element Q2 from the low-potential side of the first smoothing capacitor C1 if the switch element Q1 is in the OFF state.

According to the arrangement described above, it can control the operation such that the electric charges remaining on the first smoothing capacitor C1 are discharged through the first discharge resistor R6 rather than the resistor R5 at the time of discharging.

Figure 4:
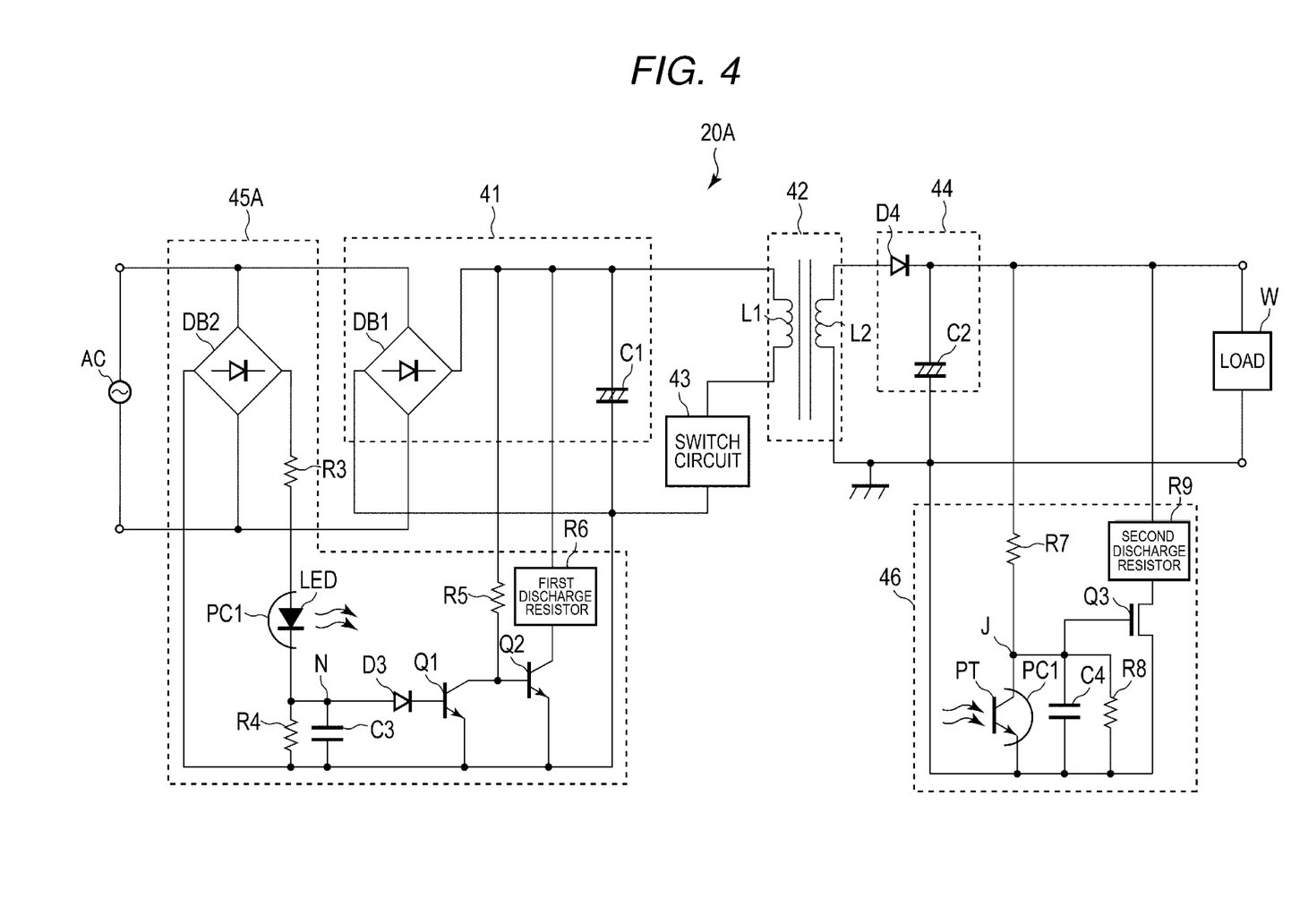
FIG. 4 is a circuit diagram illustrating a modification of the power converting device.

In the present embodiment described above, the first discharge circuit 45 converts an AC voltage to a pulsating voltage with the resistor R1, the diode D1, the resistor R2, and the diode D2 to supply the pulsating voltage to the photocoupler PC1 and the control terminal of the switch element Q1. However, the first discharge circuit 45 is not limited to the above. As illustrated in FIG. 4, the first discharge circuit 45 may include a rectifier bridge instead of the resistor R1, the diode D1, the resistor R2, and the diode D2.

FIG. 4 is a circuit diagram illustrating a power converting device 20A, which is a modification of the power converting device 20. The same components as that of the power converting device 20 are denoted with the same reference numerals and therefore, the detailed descriptions thereof are not repeated.

The power converting device 20A includes the DC voltage source 41, the isolation transformer 42, the switch circuit 43, the rectifying smoothing circuit 44, a first discharge circuit 45A, and the second discharge circuit 46.

The first discharge circuit 45A includes a rectifier bridge DB2, the resistor R3, the resistor R4, the resistor R5, the first discharge resistor R6, the diode D3, the photocoupler PC1, the switch element Q1, the switch element Q2, and the capacitor C3.

The rectifier bridge DB2 is a full-wave rectifier circuit composed of a plurality of diodes. An input terminal of the rectifier bridge DB2 is connected to the AC power supply AC. The rectifier bridge DB2 pulsates an AC voltage supplied from the AC power supply AC and supplies the pulsated positive voltage to an anode of the photocoupler PC1 via the resistor R3.

According to the arrangement described above, similar to the first discharge circuit 45, an electric current flows to the rectifier bridge DB2, the resistor R3, the light emitting diode LED of the photocoupler PC1, the diode D3, and the base of the switch element Q1 in this order with the AC voltage supplied from the AC power supply AC. Consequently, the light emitting diode LED of the photocoupler PC1 emits light and the switch element Q1 is switched to the ON state. In this way, the first discharge circuit 45A can realize the same effects as that of the first discharge circuit 45.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A power converting device, comprising:
    a rectifier bridge configured to pulsate an AC voltage to generate a pulsating voltage;
    a first smoothing capacitor configured to smooth the pulsating voltage to generate a DC voltage;
    a primary winding connected to the first smoothing capacitor;
    a switch circuit configured to switch the DC voltage supplied from the first smoothing capacitor to the primary winding; and
    a first discharge circuit comprising:
        a first discharge resistor configured to discharge electric charges remaining on the first smoothing capacitor, and
        a first switch element configured to release the first discharge resistor from the first smoothing capacitor if the AC voltage is supplied and to connect the first discharge resistor to the first smoothing capacitor if the AC voltage is not supplied and the electric charges remain on the first smoothing capacitor, wherein the first switch element has a control terminal connected to the first smoothing capacitor, and the first discharge circuit further comprises a third switch element that is switched to an ON state with the AC voltage, configured to connect the control terminal of the first switch element to a low-potential side of the first smoothing capacitor if the third switch element is in the ON state and to release the control terminal of the first switch element from the low-potential side of the first smoothing capacitor if the third switch element is in an OFF state.

2. The power converting device according to claim 1, further comprising:

a secondary winding excited by a magnetic field generated with the primary winding to generate a voltage;

a second smoothing capacitor configured to smooth the voltage generated with the secondary winding; and a second discharge circuit comprising:

a second discharge resistor configured to discharge electric charges remaining on the second smoothing capacitor, and a second switch element configured to release the second discharge resistor from the second smoothing capacitor if the AC voltage is supplied and to connect the second discharge resistor to the second smoothing capacitor if the AC voltage is not supplied and the electric charges remain on the second smoothing capacitor.

3. The power converting device according to claim 2, wherein the first discharge circuit further comprises a light emitting diode for emitting light while the AC voltage is supplied, the second discharge circuit further comprises a phototransistor that is in a conduction state while the light emitting diode is emitting light, and the second switch element has a control terminal connected to the second smoothing capacitor.

4. The power converting device according to claim 3, wherein the second switch element comprises a semiconductor transistor.

5. The power converting device according to claim 1, wherein the first switch element comprises a semiconductor transistor.

6. An image forming apparatus comprising:

an image forming unit configured to form an image on a recording medium; and a power converting device comprising:

a rectifier bridge configured to pulsate an AC voltage to generate a pulsating voltage, a first smoothing capacitor configured to smooth the pulsating voltage to generate a DC voltage, a primary winding connected to the first smoothing capacitor, a switch circuit configured to switch the DC voltage supplied from the first smoothing capacitor to the primary winding, a secondary winding excited with a magnetic field generated with the primary winding, a second smoothing capacitor configured to smooth a voltage generated with the secondary winding and supply electric power to the image forming unit, a first discharge circuit comprising:

a first discharge resistor configured to discharge electric charges remaining on the first smoothing capacitor, and a first switch element configured to release the first discharge resistor from the first smoothing capacitor if the AC voltage is supplied and to connect the first discharge resistor to the first smoothing capacitor if the AC voltage is not supplied and the electric charges remain on the first smoothing capacitor, and a second discharge circuit comprising:

a second discharge resistor configured to discharge electric charges remaining on the second smoothing capacitor, and a second switch element configured to release the second discharge resistor from the second smoothing capacitor if the AC voltage is supplied and to connect the second discharge resistor to the second smoothing capacitor if the AC voltage is not supplied and the electric charges remain on the second smoothing capacitor.

7. The image forming apparatus according to claim 6, further comprising:

the secondary winding excited by a magnetic field generated with the primary winding to generate a voltage;

the second smoothing capacitor configured to smooth the voltage generated with the secondary winding; and the second discharge circuit comprising:

the second discharge resistor configured to discharge the electric charges remaining on the second smoothing capacitor, and the second switch element configured to release the second discharge resistor from the second smoothing capacitor if the AC voltage is supplied and to connect the second discharge resistor to the second smoothing capacitor if the AC voltage is not supplied and the electric charges remain on the second smoothing capacitor.

8. The image forming apparatus according to claim 7, wherein the first discharge circuit further comprises a light emitting diode for emitting light while the AC voltage is supplied, the second discharge circuit further comprises a phototransistor that is in a conduction state while the light emitting diode is emitting light, and the second switch element has a control terminal connected to the second smoothing capacitor.

9. The image forming apparatus according to claim 8, wherein the second switch element comprises a semiconductor transistor.

10. The image forming apparatus according to claim 6, wherein the first switch element has a control terminal connected to the first smoothing capacitor, and the first discharge circuit further comprises a third switch element that is switched to an ON state with the AC voltage, configured to connect the control terminal of the first switch element to a low-potential side of the first smoothing capacitor if the third switch element is in the ON state and to release the control terminal of the first switch element from the low-potential side of the first smoothing capacitor if the third switch element is in an OFF state.

11. The image forming apparatus according to claim 6, wherein the first switch element comprises a semiconductor transistor.

12. A power converting method, comprising:
pulsating an AC voltage to generate a pulsating voltage;
smoothing the pulsating voltage to generate a DC voltage using a first smoothing capacitor;
switching the DC voltage supplied by the first smoothing capacitor to a primary winding;
discharging electric charges remaining on the first smoothing capacitor using a first discharge resistor;
releasing the first discharge resistor from the first smoothing capacitor if the AC voltage is supplied and connecting the first discharge resistor to the first smoothing capacitor if the AC voltage is not supplied and the electric charges remain on the first smoothing capacitor;
smoothing a voltage generated with a secondary winding excited by a magnetic field using a second smoothing capacitor;
discharging electric charges remaining on the second smoothing capacitor using a second discharge resistor; and
releasing the second discharge resistor from the second smoothing capacitor if the AC voltage is supplied and connecting the second discharge resistor to the second smoothing capacitor if the AC voltage is not supplied and the electric charges remain on the second smoothing capacitor.

13. The power converting method according to claim 12, further comprising:
emitting light while the AC voltage is supplied using a light emitting diode.

14. The power converting method according to claim 13, wherein
using a semiconductor transistor for releasing the second discharge resistor from the second smoothing capacitor.

15. The power converting method according to claim 12, further comprising:
switching a third switch element to an ON state with the AC voltage thereby connecting a control terminal of a first switch element to a low-potential side of the first smoothing capacitor if the third switch element is in the ON state and releasing the control terminal of a first switch element from the low-potential side of the first smoothing capacitor if the third switch element is in an OFF state.

16. The power converting method according to claim 12, wherein
using a semiconductor transistor for releasing the first discharge resistor from the first smoothing capacitor.

* * * * *